July 25, 1950          J. NEUFELD          2,516,334

RADIATION MEASUREMENT AND INSTRUMENT TESTING

Filed March 28, 1949

*INVENTOR.*
BY Jacob Neufeld

Patented July 25, 1950

2,516,334

UNITED STATES PATENT OFFICE 2,516,334

RADIATION MEASUREMENT AND INSTRUMENT TESTING

Jacob Neufeld, Oak Ridge, Tenn.

Application March 28, 1949, Serial No. 83,951

8 Claims. (Cl. 250—83.6)

This application is a continuation-in-part of application Serial No. 1,873.

This application relates to nuclear radiation measurements. It has particular reference to the measurements of heterogeneous beams comprising radiation particles of various energies. An additional and important application of my invention consists in providing a method and apparatus for testing radiation counters and similar devices for counting radiation particles resulting from nuclear disintegrations.

Results of various radiation measurements performed in the past have not always been reliable. Because of various reasons beyond the control of the observer, radiation counters fail in their performance and give erroneous results. Because of such failures, the radiation counter shows sometimes an anomalous behavior such as spurious periodic discharge, loss of counts, etc.

The present invention has as a purpose to provide a method and an arrangement to determine whether a radiation counter is operating satisfactorily and to detect spurious discharges or any other symptoms of anomalous behavior.

In various processes utilizing nuclear radiation we are dealing with homogeneous and heterogeneous beams of radiation particles. In a homogeneous beam all the particles have the same energy, and the total energy of the beam is equal to the energy of each individual particle multiplied by number of particles. In a heterogeneous beam the particles differ in energy one from the other and it is desirable then to produce an index showing the degree of departure of such a beam from homogeneity. In various instances such an index gives valuable information regarding the energy composition of a stream of nuclear particles. In particular we are interested in the distribution of kinetic energies of alpha particles as they are released from the nucleus of certain radioactive isotopes. Such a distribution has been shown in the prior art by means of a plurality of measurements. Each measurement indicated the number of particles within a certain relatively narrow energy range. A great many adjacent energy ranges had to be considered for determining the spectrum of the beam and therefore, a great many measurements had to be made to characterize the energy distribution of the particles within the beam. The present invention simplifies the measurement by providing only two indexes characterizing the radiation beam. One index represents the mean value of the energy and the other index represents a value that is related functionally in a known manner to the energy distribution of all the particles within the beam.

Other objects and advantages of the present invention will be apparent from the description which follows when taken with the drawing in which.

Figure 1:
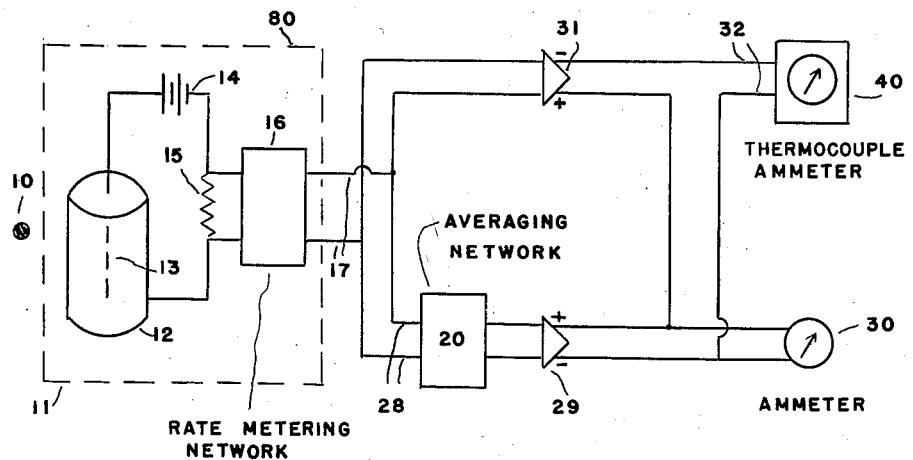
Fig. 1 shows an embodiment of my invention for testing radiation counters and for determining the composition of a beam of radiation.

Referring now to Fig. 1, numeral 11 designates a radiation counter exposed to particles radiated from a standard source 10. The particles may be alpha rays, beta rays, or photons, and the counter is suitably designed so as to selectively respond either to alpha rays or beta rays or photons. A suitable design of counter is applicable and for the purposes of illustration we have shown a counter consisting of a cylindrical cathode 12, wire anode 13, and a battery 14 in series with a suitable resistor 15 connecting the battery to the cathode. Under normal operating conditions each particle emitted by the source 10 and intercepted by the counter 11 causes the appearance of an electrical voltage impulse across the terminals of the resistor 15. Therefore, under the effect of continual emission of radiation particles from source 10, we obtain across the terminals of the resistor 15 a succession of impulses which are in turn applied to a rate metering network 16. The rate metering network is adapted to shape the pulses and to produce across its output terminals 17 a voltage representing at any instant the number of impulses per unit of time applied across its input terminals. (For a detailed description of a rate metering network see the article on "A Counting Rate Meter for Radioactivity Measurements" published in General Radio Experimenter, vol. XXII, No. 2 and 3, July-August 1947, pages 1 to 7.)

The output terminals of the rate metering network are connected to two parallel channels. One channel comprises an averaging network 20 having its input terminals 28 connected to the output of the rate metering network, of an amplifier 29 connected to the output of the averaging network, and of a standard ammeter 30 connected to the output of the amplifier 29. The averaging network 20 is of a standard construction and is adapted to translate the voltage applied across its input terminals 28 into an output voltage representing substantially the average value of the input voltage.

The source 10 is continually emitting particles at random. Assume that at a given time $t$ the counter intercepts $n$ particles per second. It is well known that the value $n$ does not have a constant value but fluctuates with time. Under normal operating where there is no failure in the performance of the counter, to each particle intercepted by the counter corresponds a pulse across the output terminals of the resistor 15. Consequently, we obtain $n$ pulses per second. These pulses are applied to the rate metering network 16, and the said network generates an output voltage that fluctuates with time and at any instant $t$ has a value $n$. This voltage is applied to the averaging network 20 which in turn produces across its output terminals a voltage $\bar{n}$ representing the average of the fluctuating input voltage $n$. The voltage $\bar{n}$ is in turn amplified in the amplifier 29 and indicated on the ammeter 30. Thus the ammeter 30 indicates the average rate of pulses derived from the counter 12.

The other channel shown in Fig. 1 comprises an amplifier 31 connected directly to the output terminals of the rate metering network 16. The outputs of the amplifiers 29, 31 are connected in series and in opposition. Consequently, the output of the amplifier 31 representing the instantaneous value $n$ of the number of pulses per second opposes the output of the amplifier 29 representing the average value $\bar{n}$ of said number of pulses per second. We obtain therefore across the terminals 32 a voltage representing the instantaneous value of the difference, i. e. $(n-\bar{n})$. This voltage is in turn applied to a thermocouple ammeter 40. The thermocouple ammeter is of standard construction and its description can be found, for instance, in Radio Engineers' Handbook by F. E. Terman, McGraw-Hill Book Co., New York, N. Y., 1943, pp. 926-928.

It is apparent that the indication of the thermocouple ammeter 40 represents the average square of the deviation of the instantaneous value of the number of pulses per second from its mean value, i. e. the average of the value $(n-\bar{n})^2$. Consequently the meter 40 provides the index of the dispersion $\sigma^2$.

In the above discussion the average $\bar{n}$ and the dispersion $\sigma^2$ are related to the instantaneous rate $n$ by the following formulas $$\bar{n}=\frac{1}{T}\int_0^T n\, dt$$

$$\sigma^2=\frac{1}{T}\int_0^T (n-\bar{n})^2 dt$$

where $t$ is the time variable and $T$ is the period of measurement.

It is well known that the fluctuations of random nature obey the type of statistic known as Poisson statistics and that such fluctuations are characterized by the equality between the mean value of the fluctuating quantity and its dispersion.

The source 10 emits particles at random and consequently if we designate by $n_1$ the number of particles intercepted by the counter and by $\sigma_1^2$ the corresponding dispersion we obtain $$\bar{n}_1=\sigma_1^2$$

If the counter operates without any failure each particle intercepted by the counter is accompanied by an almost simultaneous occurrence of a pulse across the terminals of the resistor 15. Consequently, there is a one to one correspondence between the interception of particles and appearance of electrical pulses, and therefore:

$$\bar{n}=\bar{n}_1, \text{ and } \sigma^2=\sigma_1^2$$

Consequently $$\bar{n}=\sigma^2$$

i. e. the appearance of current impulses is a random event.

On the other hand, if the counter is defective it often shows periodicities or other symptoms of anomalous behavior such as spurious periodic discharge superimposed on the true random effect of the incident radiation. In the latter case the one to one correspondence between the intercepted alpha particles and impulses is destroyed and the appearance of current impulses is not any more a random event. Consequently:

$$\bar{n}\neq\sigma^2$$

In order to ascertain whether the current impulses generated by the counter are random or not, we need to observe the indication of the ammeters 30 and 40 which indicate respectively the mean value $\bar{n}$ and the dispersion $\sigma^2$ of the pulse rate. If these two indications are equal one to the other, then the pulses appear at random and the counter operates without failure. If, however, the two indications are not equal one to another, the pulses do not appear at random and the counter is defective.

It is well understood that in order to test the performance of the counter 11 we can replace the source 10 by any other source of random radiation, i. e. we can expose the counter directly to cosmic radiation.

It is therefore apparent that by observing the indications of the ammeter 30 and 40 we can determine whether the counter operates without failure.

Figure 2:
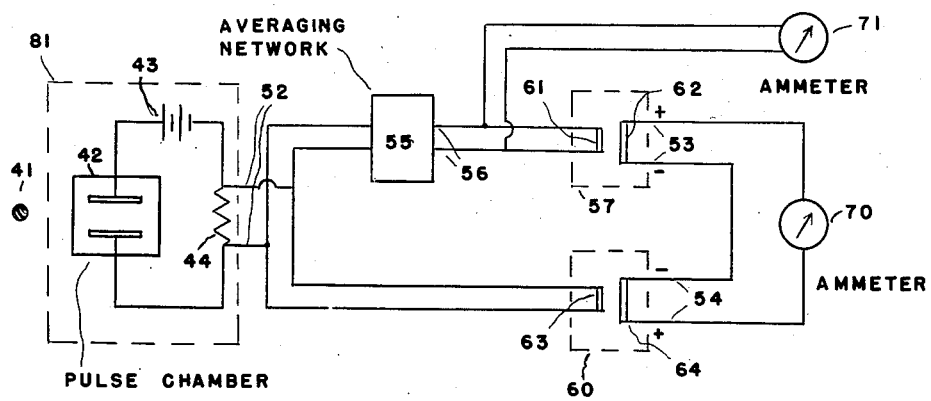
Fig. 2 shows an instrumental arrangement for determining the energy spectrum of a beam of radiation particles.

Consider now Fig. 2 that utilizes the principles of my invention to study the composition of a beam of alpha particles and provides an index showing the energy distribution of particles in the beam. Referring now more particularly to Fig. 2, numeral 41 represents a source emitting alpha particles and numeral 42 represents a pulse chamber in series with a battery 43 and resistor 44. The pulse chamber is of a standard construction and adapted to produce across the output terminals 52 of the resistor 44 pulses coincident with the arrival of alpha rays and having magnitudes representing energies of individual alpha particles. The output terminals 52 are connected to two channels having output terminals 53 and 54, respectively. One of these channels consists of an averaging network 55 having its output terminals 56 connected to a thermocouple squarer within dotted lines 57, said thermocouple squarer being provided with output terminals 53. The other channel consists of a thermocouple squarer within dotted lines 60, said squarer being provided with output terminals 54. Let the voltage across the terminals 52 be $E$. This voltage represents the succession of impulses that correspond to the energies of incoming alpha particles. These impulses are applied to the averaging network 55, and consequently we obtain across the output terminals 56 of the averaging network a voltage representing the mean value of the energy, i. e. $\bar{E}$. This voltage is applied to a heating element 61 within the block 57. The amount of heat generated by the element 61 is equal to the square of the current which in this particular case is proportional to $(\bar{E})^2$. Consequently, a voltage generated by the thermocouple 62 and appearing across the terminals 53 represents the value $(\bar{E})^2$. The heating element 63 in the block 60 receives the fluctuating voltage E; consequently, the heat developed is equal to $E^2$ and the corresponding voltage produced by the thermocouple 64 across the terminals 54 represents the value $\overline{E^2}$. The voltages across terminals 53 and 54 oppose each other and, consequently, the resultant voltage applied to the ammeter 70 is equal to $$\sigma^2 = \overline{E^2} - (\bar{E})^2$$

It is therefore apparent that the indication of the meter 70 represents the dispersion.

The output terminals 56 of the averaging network 55 are also connected directly to an ammeter 71, said ammeter 71 indicating therefore $\bar{E}$, i. e. the average value of the fluctuating voltage.

It is therefore apparent the meter 71 indicates the average energy of incoming alpha particles and the meter 70 indicates the dispersion of energy. If, for instance, the indication of the meter 70 is small when compared to the indication of the meter 71, we may deduce that the beam of particles is monochromatic. If, however, the indication of the meter 70 is large relative to the indication of the meter 71, we may conclude that at least two or more monochromatic beams of alpha particles are detected by the chamber 42. Consequently, an indication has been provided for representing the character of nuclear radiation.

I claim:

1. In an arrangement for testing the performance of a radiation counter by exposing said counter to a stream of radiation particles emitted at random, said counter translating the incoming particles into current impulses, an electrical network connected to said counter for producing a fluctuating current representing at any instant the rate of occurrence of said impulses, another network responsive to the output of said first network for producing a signal related to all the values of said current within a selected time interval, and a means jointly responsive to the outputs of said two networks for producing an indication representing a relation between said two outputs.

2. In an arrangement for testing the performance of a radiation counter by exposing said counter to a stream of radiation particles emitted at random, said counter translating the incoming particles into current impulses, an electrical network connected to said counter for producing a fluctuating current representing at any instant the rate of occurrence of said impulses, another network responsive to the output of said first network for producing a signal related to all the values of said current within a selected time interval, a means jointly responsive to the outputs of said two networks for producing an indication representing a relation between said two outputs, and another means responsive to the output of one of said networks for indicating said output.

3. In an arrangement for testing the performance of a radiation counter by exposing said counter to a stream of radiation particles emitted at random, said counter being adapted to produce a current impulse when interacting with each radiation particle, means connected to said counter for producing a fluctuating current having magnitude representing at any instant the rate of occurrence of said impulses, an averaging network connected to said means for producing a signal representing substantially the average value of said current, a second means jointly responsive to the output of said network and to the output of said first means for producing a resultant indication, and a third means connected to the output of said averaging network for producing an indication of the value of said output; whereby said two indications represent the performance of said radiation counter.

4. A testing instrument for determining the nature of incoming radiation, comprising a detector adapted to translate the incoming radiation into corresponding current fluctuations, a network responsive to the output of said detector for producing a signal related to all the values of said current within a selected time interval, and a means jointly responsive to the output of said network and to the output of said detector for producing an indication representing a relation between said two outputs.

5. A testing instrument for determining the nature of incoming radiation, comprising a detector adapted to translate the incoming radiation into a corresponding fluctuating current, an electrical network responsive to the output of said detector for producing a signal representing substantially the mean value of said current, said mean value corresponding to a selected time interval, and a means jointly responsive to the output of said network and to the output of said detector for producing an indication of the relation between said current and said signal.

6. A testing instrument for determining the nature of incoming radiation, comprising a detector adapted to translate the incoming radiation into a corresponding fluctuating current, an electrical network responsive to the output of said detector for producing a signal representing substantially the mean value of said current, said mean value corresponding to a determined time interval, an indicator for indicating said mean value, and a means responsive to the output of said network and to the output of said detector for producing an indication representing a relation between said two outputs.

7. A testing instrument for determining the nature of incoming radiation comprising a detector adapted to translate the incoming radiation into a corresponding fluctuating current, an averaging network responsive to the output of said detector for producing a signal representing substantially the average value of said current, and a means jointly responsive to the output of said averaging network and to the output of said detector for producing an indication representing the departure of said fluctuating quantity from its average value.

8. A testing instrument for determining the nature of incoming radiation particles, said particles differing one from the other in their energy value, comprising a detector adapted to translate the incoming particles into corresponding impulses, said impulses having magnitudes representing the energies of corresponding particles, an averaging network responsive to the output of said detector for producing a signal representing the average value of said current, and a means jointly responsive to the output of said averaging network and to the output of said detector for producing an indication representing a relation between said fluctuating quantity and its average value.

JACOB NEUFELD.

No references cited.